W. S. THOMAS.
Carriage-Spring.
No 6,839
Patented Oct 30, 1849.
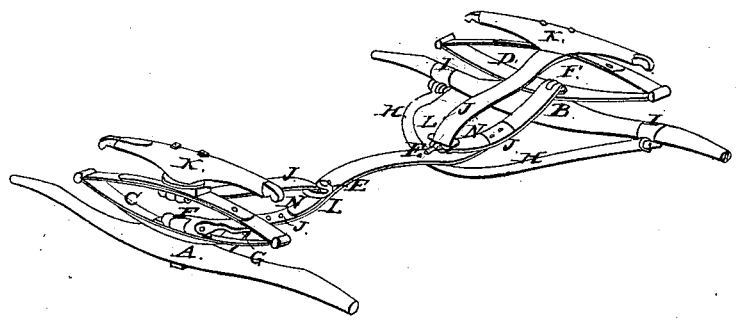

UNITED STATES PATENT OFFICE.

WM. S. THOMAS, OF NORWICH, NEW YORK.

SPRINGS FOR CARRIAGES.

Specification of Letters Patent No. 6,839, dated October 30, 1849.

*To all whom it may concern:*

Be it known that I, WILLIAM S. THOMAS, of Norwich, in the county of Chenango and State of New York, have invented a new and useful Improvement in the Mode of Mounting Coaches and other Spring-Carriages; and I do hereby declare that the following is a full and exact description of said improvement, reference being had to the annexed drawings, making part of this specification.

The two axletrees, A, B, are each surmounted by an elliptic spring C, D, and the two springs are connected by a spring reach, E E, which has a hinge-joint at each end, the middle section of each hinge joint, being the head of a bolt F, which passes down through the spring and axletree, and is secured by a nut below; this reach is composed of a single plate, or bar of steel, that is bent upward in the center into the form of a bow, as clearly shown in the drawing, and is stayed near the forward by a branch G, attached to the underside thereof, and extends forward to the under side of the axletree A, and is connected thereto by the hinge-bolt F, which also passes through the branch. Two lateral braces or hounds, H, H, are attached to the reach at a point two or three feet in front of the axletree B, and diverging back to the axletree, are connected by hinge-joints to two grips, I, I, which encircle the same. Two U-springs J, J, are attached by bolts at J' firmly to the upper sides of the reach, near the two ends thereof, and extend for a few inches toward each other, then turning upward are bent in the contrary direction and extend to the upper sections of the two elliptic springs, immediately under the spring-bars K K to which they are connected by hinge-joints and bolts in a manner similar to the connection of the reach to the axletree. The bow or bent part of each U-spring is connected to the reach by a clasp, L, and screw, near E, E; the reach being bent upward at these points to accommodate those connections, and give elasticity to the reach. Within the bow or bent part of the U-spring is another and shorter spring N; this spring is not attached to the first, but is applied and adjusted whenever occasion requires, and is held in place by the clasp. The purpose and effect of the springs thus arranged, is to render their elasticity easily adjustable by interposing more or less leaves N, within the U-springs J, J, and by the combination of the U-springs with the reach bent up at the middle, as before described, by which I obtain a certain degree of flexibility in the parts which produces a peculiarity of motion in the carriage, resembling that produced by thorough braces, when the wheels strike an impediment, or pass over uneven ground.

I do not claim U-springs in combination with elliptic ones; nor do I claim a spring perch or reach; but What I do claim as my invention, and desire to secure by Letters Patent, is—

The combination of the adjustable U-springs with the bent spring reach by bolting one end of said springs to said reach and connecting the bend of said spring to the bent part of the reach by an adjustable link or clasp in the manner and for the purposes above set forth.

WM. S. THOMAS.

Witnesses:
WM. GREENOUGH,
G. GAY.